United States Patent Office 3,352,220
Patented Nov. 14, 1967

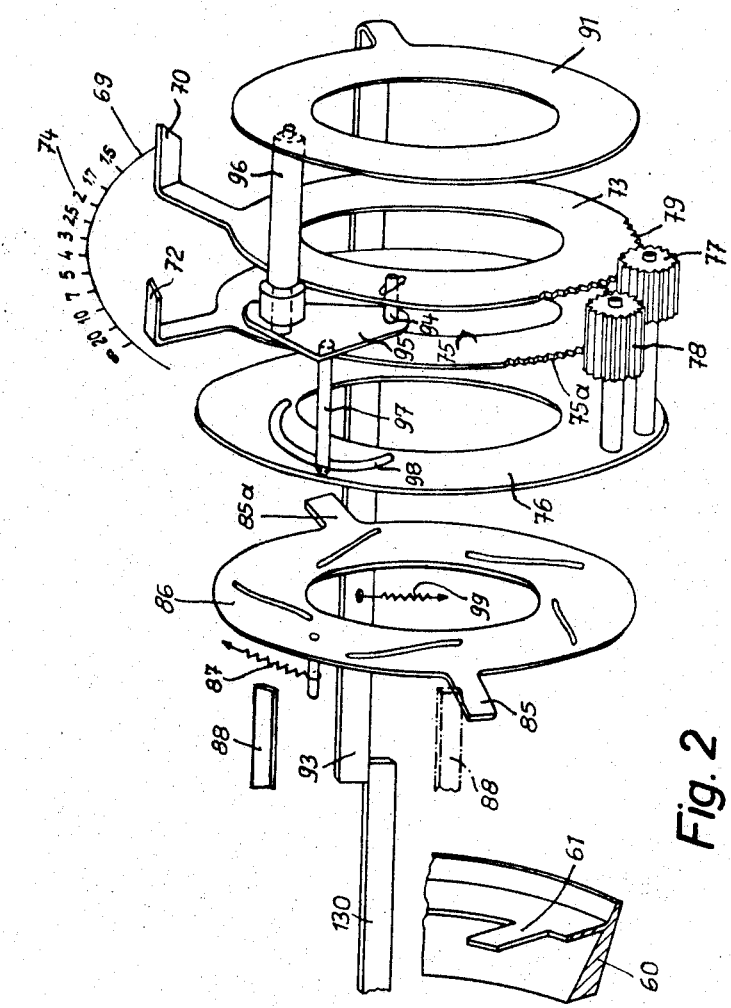

3,352,220
PHOTOGRAPHIC CAMERA WITH DEPTH OF FIELD INDICATOR
Rudolf Lang, Grafing, near Munich, and Karl Härtl, Munich, Germany, assignors to Compur-Werk Gesellschaft mit beschrankter Haftung & Co., Munich, Germany, a German firm
Filed Sept. 22, 1964, Ser. No. 398,231
Claims priority, application Germany, Sept. 27, 1963, C 30,991
10 Claims. (Cl. 95—10)

ABSTRACT OF THE DISCLOSURE

A photographic lens mount, which may be of the removable and interchangeable type, has a focusing scale, an adjustable diaphragm, and a pair of pointers movable with respect to the focusing scale to indicate the depth of field for any particular setting of the diaphragm aperture. The diaphragm aperture may be adjusted either manually, or automatically under the influence of an exposure meter mechanism built into the associated camera. When a shutter release plunger on the camera is partially depressed, only to an intermediate position, the depth of field pointers are moved to a position indicating the depth of field resulting from the diaphragm aperture which has been set manually, or which will be set automatically if the shutter is released to make an exposure. The user may observe the pointers to see whether the indicated depth of field satisfies his requirements. If so, he may continue the depression of the release plunger to completion, to release the shutter and make an exposure. If not, he may allow the release plunger to return upwardly to its initial rest position without making an exposure, and may readjust some other exposure factor (e.g., shutter speed) and again depress the shutter release plunger only partially, to see what the depth of field will be under the changed conditions and see whether the new depth of field satisfies his requirements.

---

Figure 1:
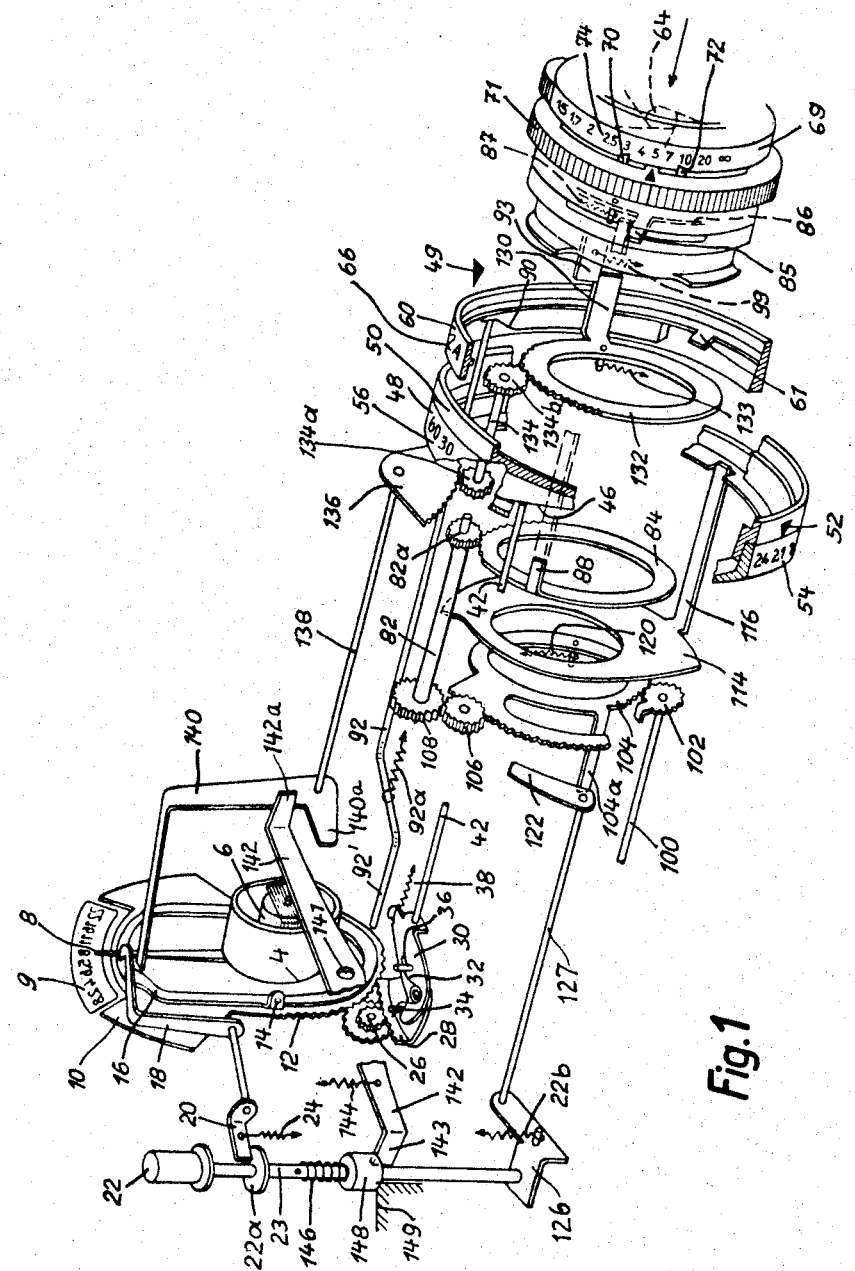

This invention relates to a photographic camera, and more particularly to a photographic camera having a photoelectric exposure meter, and adjustable diaphragm the aperture of which may be controlled either by hand or by the exposure meter, and a depth of field indicator.

An object of the invention is the provision of a generally improved and more satisfactory camera of this kind.

Another object is the provision of a camera in which the depth of field indicator is effective to give a correct indication regardless of whether the diaphragm aperture is to be set manually or whether it is to be set by means of the exposure meter.

Still another object is the provision of such a camera so designed and constructed that the adjustable diaphragm and the depth of field indicator may be incorporated in an interchangeable objective or lens mount which is attachable to and detachable from the rest of the camera on which the exposure meter is located.

A further object is the provision of such a construction which is adaptable to and requires relatively few additional parts in comparison to previous cameras of the same general kind but not having the depth of field indicator.

A still further object is the provision of a camera of this kind in which the depth of field indicator and the control parts for controlling it represent a relatively simple and compact modification of a previously known camera construction, which can be accomplished with relatively inexpensive tooling.

These and other desirable objects may be attained in the manner disclosed as an illustrative embodiment of the invention in the following description and in the accompanying drawings forming a part hereof, in which:

FIG. 1 is a perspective view of those parts of a photographic camera which are significant with respect to the present invention, many other parts being omitted for the sake of clarity; and FIG. 2 is a similar perspective view, on a larger scale, of certain elements near the front or right hand side of the assembly shown in FIG. 1, illustrating additional details thereof.

The depth of field indicator of the present invention, and the control parts thereof, may be applied to a camera which is otherwise of known construction well understood in the art. One suitable form of basic camera construction to which the present invention may be applied, is the known form essentially as disclosed, for example, in Singer Patent 3,071,054, granted Jan. 1, 1963, and Singer Patent 3,094,052, granted June 18, 1963. Reference may also be made to Gebele Patent 3,013,478, granted Dec. 19, 1961, disclosing a specifically different but generally similar form of camera. The present invention may be regarded as an improvement upon or modification of the cameras disclosed in these patents just mentioned, and the following description proceeds on the assumption that the reader is already familiar with cameras of these kinds so that it is not necessary to describe or illustrate the basic camera structure which is already known.

Referring now to the drawings, and initially to FIG. 1, the camera includes a photoelectric exposure meter comprising the permanent magnet 4 and the usual moving coil 6 electrically connected to and receiving current from a photocell (not shown) and fastened to a hand or pointer 8 which sweeps over a diaphragm aperture scale 9 visible to the user of the camera. The magnet 4 of the indicating instrument is mounted on a base plate 10 which is rotatable on the camera body or housing about a rotary axis concentric with the rotary axis of the moving coil 6 and pointer 8. For turning the base plate 10, for the purpose of feeding into the mechanism the variable factors of shutter speed and film speed, the plate 10 has gear teeth 12 on part of its circumference, concentric with its rotary axis.

A clamping frame 16 is mounted for oscillation on pins 14 on the base plate 10. A lever 18 engages the clamping frame 16 and swings the clamping frame on the pins 14 in a direction to clamp the pointer 8 tightly against a stationary part, when the lever 18 is allowed to swing in a clamping direction under the influence of a spring 24 secured to an arm 20 which is operatively connected to the clamping lever 18.

The camera release or trip button 22, accessible at the top of the camera, is secured to a rod or plunger 23 which extends downwardly in the camera body and has a collar 22a fixed thereto, underlying the lever 20. The lower end of the plunger rod 23 overlies a lever 126 fixed to a shaft 127, and a spring 22b tends to raise the lever 126, thereby tending to hold the plunger rod 23 in its uppermost position. In such position, the collar 22a raises the lever 20 against the force of the spring 24 (the spring 22b being stronger than the spring 24) and thereby releases the clamping pressure of the clamping lever 18 against the clamping frame 16. But when the release plunger 22 is manually depressed, the downward motion of the collar 22a relieves the upward pressure on the lever 20, so that the spring 24 can then pull this lever 20 downwardly, and cause rearward swinging of the lever 18, to swing the clamping frame 16 rearwardly so as to clamp the exposure meter pointer 8 firmly in whatever position it may have assumed just prior to the clamping action.

A stepped pinion 26 has one set of teeth meshing with the above mentioned teeth 12 on the base plate 10, and another set of teeth engaging crown gear teeth on a segment plate 28. This segment 28 is mounted together with a lever 30 for oscillation on a common vertical pivot pin in the camera body or housing. A spring 32 coiled around the pivot pin engages at one end behind a pin 34 on the segment 28 and at the other end behind a pin 36 on the lever 30, thus tending to swing the segment and the lever relative to each other in a direction to cause an ear on the lever 30 to stay in abutting relation to the pin 34 on the segment. The spring 32 thus limits the torque which can be transmitted through the lever 30 to the segment 28. A spring 36 is anchored at one end in fixed position, and secured at its other end to the lever 30, pulling the lever in a direction to cause the ear thereon to engage the pin 34 to move the segment 28 in a corresponding direction. A thrust pin 42, extending parallel to the optical axis, bears at its rear end on the end of the lever 30, and at its forward end against the thrust cam 46 on the shutter speed setting ring 48 which is manually rotatable about the optical axis as a center, or preferably on a separate ring 50 which normally turns with the ring 48 but may be separately adjustable in a rotary direction relative to the ring 48, for the purpose of feeding the factor of film speed into the mechanism. Film speed may be set by bringing a reference mark 52 on the ring 50 opposite the desired graduation of the film speed scale 54 on the ring 48, in known manner. Shutter speed is set by turning the ring 48 (the ring 50 turning with it) to bring any desired graduation of the shutter speed scale 56, marked on the ring 48, opposite a stationary reference point shown schematically at 49. Thus the combined factors of film speed and shutter speed are fed into the exposure meter mechanism, since the rise or fall of the cam 46 (depending upon the direction of rotation of the rings 48 and 50) pushes the rod 42 further rearwardly or allows it to move further forwardly, thereby causing turning of the lever 30 and the crown gear 28, rotating the pinion 26, and causing bodily rotation of the mounting plate 10.

The camera shutter itself is of known construction and need not be illustrated in detail. It is sufficient to say that the shutter includes an internal time control ring 114 coupled by a lug 116 to the manual shutter speed setting ring 48, so that when the shutter speed ring 48 is turned to set the mechanism for a desired shutter speed, this causes a turning of the ring 114 and sets the exposure timing mechanism or delaying mechanism controlled by the ring 114, in known manner.

A feeler device or detector device, operating under the influence of the exposure meter, includes a feeler arm 140 mounted for rotation on a pivotal axis concentric with that of the coil 6 and pointer 8 of the exposure meter. This feeler arm 140 serves to control the size of the aperture of the diaphragm, when automatic regulation thereof under the influence of the exposure meter is desired. The adjustable diaphragm, preferably of the iris type, is shown somewhat schematically at 64 in FIG. 1, and includes a series of pivoted diaphragm leaves the positions of which are controlled in known manner by the usual oblique slots in the usual diaphragm control ring 86 rotatable about the optical axis and partially shown in FIG. 1 and better shown in FIG. 2. The diaphragm leaves and the control ring 86 are preferably but not necessarily built into what is commonly known in the art as an interchangeable objective or lens mount, that is, one which is interchangeably mounted on the camera body as for example by means of a conventional bayonet type of connection, so that the lens mount may be removed and replaced by another one having a different focal length or other different characteristics. One of the features of the present invention is that the diaphragm control means and the depth of field indicator and control means are so designed and constructed that they may be incorporated in an interchangeable lens mount, although not necessarily in such an interchangeable mount, since they may equally well be in a lens mount permanently fastened to the camera.

The above mentioned feeler arm 140 is fixed to the rear end of a shaft 138 extending forwardly parallel to the optical axis, and fixed at its forward end to a toothed segment 136 which meshes with a pinion 134a on a short shaft 134 parallel to the optical axis. Another pinion 134b on this same shaft 134 meshes with the teeth of an intermediate ring 132 rotatable about the optical axis as a center. A spring 133 tends to turn this ring 132 in a clockwise direction when viewed from the front of the camera, thereby tending to swing the feeler arm 140 also in a clockwise direction into contact with the exposure meter pointer 8. The intermediate ring 132 has a forwardly extending lug 130 which cooperates with a driving lug 93 extending rearwardly from a setting ring 91 of the depth of field indicating mechanism, as further described below.

The above mentioned diaphragm control ring 86 which controls the aperture of the diaphragm leaves, has a radial lug 85 at one point on its periphery, and another radial lug 85a at another point circumferentially spaced from the first lug. The lug 85 cooperates with a lug 88 extending forwardly from an actuating ring 84 rotatably arranged in the shutter for rotation about the optical axis. The other lug 85a on the ring 86 cooperates with the previously mentioned driving lug 93 on the setting ring 91 of the depth of field mechanism. The diaphragm control ring 86 is biased by a spring 87 which tends to turn the ring in a clockwise direction when viewed from the front of the camera, rotation of the ring in this direction serving to reduce the size of the diaphragm aperture. The depth of field setting ring 91 and its lug 93 are also biased in the same clockwise direction by a spring 99.

The shutter (which is of known form as already mentioned above) is of the type variously called a cocking shutter or tensioned shutter or set shutter, meaning that it must be set or tensioned or cocked in advance of making the exposure. The tensioning or cocking shaft is partially illustrated at 100 in FIG. 1, and is preferably connected in known manner to the film winding or film transport mechanism of the camera, so that the shutter is automatically tensioned or cocked when the film is advanced. See, for example, what is said about the corresponding tensioning shaft 100 in the above mentioned Patent 3,094,052, and the connection of the shutter tensioning shaft to the film winding mechanism as described and schematically illustrated in the above mentioned Patent 3,013,478.

The tensioning shaft 100 carries a tensioning pinion 102 which, upon rotation of the shaft, serves to rotate the tensioning ring 104 which rotates about the optical axis as a center. The ring is urged in a counterclockwise direction by the spring 120. Rotation of the ring 104 in a clockwise direction, against the force of the spring 120, serves to tension or cock the main driving member or "master member" of the shutter, in a manner well understood in the art. The details of the master member and of the shutter blades and of the way in which the blades are opened and closed by the running down movement of the master member, are not important for purposes of the present invention, and are not illustrated.

The tensioning motion imparted to the ring 104 by rotation of the shaft 100, is further imparted to the previously mentioned ring 84 by a gear train comprising a pinion 106 which meshes with gear teeth on the ring 104, this pinion driving another pinion 108 on the rear end of the shaft 82. A pinion 82a at the forward end of the shaft 82 meshes with gear teeth on the periphery of the ring 84, so that when the tensioning ring 104 is turned clockwise in a tensioning direction, it drives the ring 84 in a counterclockwise direction, whereby the previously mentioned lug 88 on the ring 84 bears against the ear or lug 85 on the diaphragm aperture control ring 86, and turns the ring 86 in a diaphragm-opening direction against the force of the spring 87. Thus, when the shutter is tensioned, the diaphragm is moved to its maximum aperture position. Upon completion of the tensioning operation, a latching pawl 122 drops behind a lug 104a on the tensioning ring 104 and holds this ring in its tensioned position. This latching pawl 122 is secured to the previously mentioned shaft 127, which is connected to the lever 126 under the lower end of the plunger rod 23, so that downward motion of the release plunger 22 serves to release the latching pawl 122, to initiate the running down motion of the shutter and associated mechanism.

The camera is provided with a switching device or selecting device 60, preferably in the form of a ring rotatable about the optical axis as a center. The switching ring 60 has an internal lug or ear 61 which cooperates with an arm 130 on a ring 132 as further described below, and the setting ring also has a scale 66 marked externally on its periphery, which scale is graduated, like the scale 9, in terms of diaphragm aperture according to the usual f numbers. At one end of the diaphragm aperture scale 66 is the graduation A, standing for automatic operation. The scale is read in conjunction with the same stationary reference point 49 which is used for reading the shutter speed scale 56.

Within the switching ring 60 is a cam 90 which has a rise in a direction parallel to the optical axis and which cooperates with the forward end of a thrust rod 92. The cam is so shaped that when the switching ring 60 is in its automatic setting position, with the graduation A opposite the reference mark 49, the rod 92 is in its most forward position, under the influence of the spring 92a which tends to pull the rod forwardly. In this position, the offset or cranked rear end 92' of the rod is out of the way of the clamping frame 16 and has no influence thereon. When the switching ring 60 is turned away from the A position, to cause manual setting of the diaphragm aperture to any desired aperture indicated by that part of the scale 66 which is brought opposite the mark 49, then the cam 90 forces the rod 92 rearwardly against the action of the spring 92a, so that the offset rear end 92' of the rod engages a part of the clamping frame 16 and holds the clamping frame in an unclamped position so that it cannot serve to clamp the pointer 8 of the exposure meter. It is only when the switching ring 60 is in one of the manually set aperture positions that the lug 61 thereon engages the arm 130 on the ring 132 and swings this ring (against the force of the spring 133) to a position determined by the position of the ring 60. When the ring 60 is in the A or automatic position, the lug 61 is out of the range of travel of the arm 130 and the ring 132 is free to move through its range under the influence or control of the feeler 140 in accordance with the then clamped position of the exposure meter pointer 8.

The lens mount in which the depth of field indicating mechanism of the present invention is installed, is indicated in general at 71 in FIG. 1, and is of the focusing type, having a focusing ring 69 rotatable about the optical axis to bring any desired graduation of the focus distance scale 74 opposite the stationary reference mark shown in FIG. 1. The depth of field is indicated by the two pointers 70 and 72 which swing back and forth toward and away from each other on opposite sides of the reference point on the mount 71, thereby indicating the respective near and far limits of sharp focus, with reference to the distance scale 74, as well understood in the art. The manner in which the depth of field indicating mechanism is controlled from other parts of the camera constitutes an important and novel feature of the present invention, but the basic construction of the depth of field indicator itself (other than the way it is controlled from other parts) is known per se, and may be substantially the same as that disclosed in Gebele Patent 2,957,398, granted October 25, 1960, to which reference is made for further details. In view of the disclosure in the patent just mentioned, it is sufficient here to say that the pointers 70 and 72 are formed on rotary rings 73 and 75, respectively, which are operatively connected to each other to turn in opposite directions by means of two pinions 77 and 78 which mesh with each other, the pinion 77 also meshing with gear teeth 79 on the ring 73, while the pinion 78 meshes also with gear teeth 75a on the ring 75. The pinions rotate on pins fixed to a stationary ring 76.

The control ring 91, also rotatable about the optical axis concentrically with the rings 73 and 75, has a stud 96 fixed to it, which engages with the plate 95 which has one pin 94 engaging in a radial slot in the ring 73, and another pin 97 engaging in a cam slot 98 in the stationary ring 76. As the ring 91 is turned, the pin 96 is carried along with it, and this moves the oscillating plate 95 in a generally corresponding manner but with some variation caused by the cam slot 98, so that the ring 73 is carried along in a general manner with the ring 91, but with some variation controlled by the cam slot. This variation brings about the necessary non-uniformity of motion of the ring 73 with respect to the ring 91, to make the necessary correction for the non-linear relation between the actual depth of field and the turning motion of the diaphragm aperture control ring 86, the motion of which, upon setting the diaphragm to a new aperture, corresponds to that of the ring 91. The second depth of field indicator ring 75 is not separately driven from the ring 91, but is driven through the same angle as ring 73 in an opposite direction by means of the gears 77 and 78.

The pointers 70 and 72 tend to move apart, away from each other, under the action of the spring 99. Thus, when the depth of field indicator is installed in an interchangeable lens mount, the removal of the lens mount from the camera serves to remove the arm 93 on the ring 91 from the influence of the arm 130 which remains on the camera body, and to remove the arm 85 on the ring 86 from the influence of the arm 88 which remains on the camera body. Hence, when the lens mount is removed from the camera, the springs 87 and 99 in the lens mount will turn the diaphragm to its minimum aperture and at the same time turn the depth of field pointers 70 and 72 to their positions of maximum separation from each other, corresponding to maximum depth of field, which is correct, of course, for minimum diaphragm aperture. Replacement of the interchangeable lens mount on the camera brings the arm 93 into cooperation with the arm 130 on the camera swinging the ring 91 to reduce the indicated depth of field to a value determined by the position at that time of the arm 130 and ring 132, which would normally be the position of maximum diaphragm aperture and minimum depth of field.

Under the influence of the spring 133, the feeler arm 140 tends to follow the pointer 8 of the exposure meter. In the rest position of the mechanism, however, the feeler arm 140 is turned counterclockwise, when viewed from the front of the camera, to a position out of the range of movement of the pointer 8, by means of an intermediate lever 142 (FIG. 1) pivoted on a fixed pivot at the location 141. The right hand end (viewed from the front as in FIG. 1) of this lever 142 is bent as indicated at 142a so as to overlie a lateral extension 140a on the feeler lever 140, so that when the right end of the lever 142 moves downwardly, it engages the part 140a and swings the feeler 140, against the action of the spring 133, to hold the feeler out of the range of the pointer 8, in a position corresponding to maximum diaphragm aperture. This movement of the lever 142 is caused by the force of the spring 144 which tends to pull upwardly on the left hand end of the lever.

The left end of the lever 142 is bent as indicated at 143 so as to underlie a sleeve 148 slidable vertically on the plunger rod 23 and normally urged downwardly by a spring 146 coiled around the plunger rod, the upper end of the spring being anchored to the rod and the lower end pressing downwardly on the sleeve. A fixed stop 149 in the camera body limits the possible downward movement of the sleeve. With this arrangement, there is a distinct pressure point readily felt by the user when he presses downwardly on the plunger 22, separating the first part of the downward release or tripping movement, until the sleeve 148 comes to rest on the abutment 149, from the second part of the downward movement wherein the plunger continues to move downwardly after the sleeve has come to rest on the abutment 149 and has caused the lever 142 to release the feeler 140.

In FIG. 1, the parts are illustrated in the normal run-down position at the end of an exposure, except that the release plunger or trip member 22 is still in its downward or depressed position and has not yet been released by the finger of the operator. When the finger pressure on the plunger 22 is removed, the plunger will return upwardly to its initial starting position, under the influence of the springs 22b and 144. The sleeve 148 follows this upward movement and thereby releases the intermediate lever 142, which consequently turns in a clockwise direction under the action of its spring 144, so that the part 142a will engage the part 140a of the feeler and turn the feeler 140 in a counterclockwise direction out of the range of movement of the exposure meter pointer 8, against a limiting stop, not shown. This counterclockwise rotation of the feeler 140 is powered by the spring 144, which is sufficiently powerful to overcome the springs 99 and 133 which both tend to turn the feeler in the opposite direction. Thus, when the trip or trigger plunger 22 is released for its full upward movement, the spring 144 causes the diaphragm to be fully opened to maximum aperture and causes the depth of field indicators 70 and 72 to move relatively close together to the minimum depth of field indication which corresponds to the maximum aperture.

The tensioning or cocking of the shutter must take place before the next photograph is taken, and this is done, as above explained, preferably by operating the film feeding mechanism which turns the shaft 100 and rotates the tensioning ring 104 in a clockwise direction until the latch 122 engages behind the lug 104a of the ring 104. This clockwise tensioning movement of the ring 104 causes counterclockwise rotation of the ring 84, thus moving its lug 88 from the position shown in full lines in FIG. 2 to the position shown in dot dash lines. The cooperation of this lug 88 with the lug 85 on the diaphragm control ring 86 insures that the diaphragm leaves will be held fully open in maximum aperture position so long as the shutter remains in tensioned or cocked condition.

Assuming that the photograph is to be taken with automatic regulation of the diaphragm, the switching ring 66 will have been turned so that the designation A thereon is opposite the reference point 49, and in this position of the ring, the cam 90 thereof allows the rod 92 to assume its forward position where it does not interfere with the clamping action of the clamping frame 16. The shutter speed ring 48 is set for the desired shutter speed manually selected by the operator. Through the action of the cam 46 on the thrust rod 42, this automatically feeds the shutter speed factor (and also the film speed factor, previously set on the ring 50) into the exposure meter mechanism. The parts are now ready for taking the photograph, or for checking the depth of field if it is desired to do so before actually taking the photograph. When the camera is pointed toward the scene to be photographed, the photocell of the light meter will cause the pointer 8 to swing to an appropriate position dependent upon the brightness of the scene.

Now if the camera release or trip button 22 is partially depressed manually, the downward motion of the collar 22a will relieve the upward pressure on the lever 20, allowing the spring 24 to move the clamping lever 18 so that the clamping frame clamps the pointer 8 tightly in whatever position it then occupies. Then during continued downward movement of the release button 22, the spring loaded sleeve 148 moves the lever 142 against the force of the spring 144, thereby relieving the pressure on the feeler 140 so that the springs 133 and 99 can swing the feeler 140 until it comes into contact with and is stopped by the clamped pointer 8. The operator feels the added resistance to the downward movement of the release button 22, when the sleeve 148 engages the fixed stop 149, and he can stop the downward movement at this point if he desires to check the depth of field before continuing the downward movement to trip or release the shutter and make the actual exposure.

With the release plunger held in this intermediate position, the diaphragm leaves remain fully open because they are held in this position by the lug 88, but the depth of field indicator pointers 70 and 72 indicate what the depth of field will be if the exposure is completed and the diaphragm is allowed to close down to the position determined by the exposure meter pointer 8. The above mentioned swinging of the feeler 140 until it makes contact with and is stopped by the pointer 8, is accompanied, of course, by corresponding rotation of the ring 132, thereby moving the lug 130 on this ring, and allowing the spring 99 to cause corresponding movement of the lug 93 which is entrained with the lug 130. This allows the ring 91, which carries the lug 93, to turn to a position determined by the position of the exposure meter pointer 8, and the turning of this ring 91 serves to operate the depth of field indicator pointers 70 and 72, to positions indicating what the depth of field will be, on the focus distance scale 74. If this depth of field is satisfactory to the operator, he immediately completes the downward movement of the release button 22, and the additional downward movement thereof releases the latch 122, so that the tensioning ring 104 can commence its counterclockwise or return movement under the influence of its spring 120, during the course of which return movement it unlatches the master member of the shutter and the master member opens and closes the shutter blades to make the exposure in the familiar manner well understood in the art. Also, during this return movement of the ring 104, but before the master member is unlatched at the end of such return movement, the ring 84 also turns and moves the lug 88 in a clockwise direction so that it no longer obstructs the clockwise motion of the diaphragm control ring 86. Thus the diaphragm control ring is able, under the influence of its spring 87, to close the diaphragm leaves down to whatever aperture is permitted by the position of the lug 93 serving as a stop for the lug 85a of the ring 86, the position of the lug 93 being dependent, in turn, on the position of the lug 130 controlled by the feeler 140 and pointer 8.

If the depth of field indication is unsatisfactory to the operator, when he observes it upon partial depression of the release plunger 22, he does not complete the downward movement of the release plunger but, instead, removes his finger from it and allows the release plunger to rise to its initial position. Thereby the lever 142 acts on the feeler 140 to remove it from the range of movement of the pointer 8, and the clamping frame 16 releases the pointer 8. The operator may then turn the shutter speed setting ring 48 to select a new shutter speed, which will, of course, result in a different diaphragm aperture setting and a different depth of field indication, assuming that the brightness of the scene remains unchanged. The process is then repeated, the operator again depressing the release button 22 until he feels the pressure point, then observing the new indication of depth of field, and completing the downward movement of the release plunger 22 to make the exposure if the depth of field indication is satisfactory, or allowing the plunger to rise once more if the depth of field indication is unsatisfactory.

At the completion of the exposure, the downward finger pressure on the release plunger 22 is removed and the plunger rises to its rest position, so that the pointer 8 is unclamped and the feeler 140 is removed from the vicinity of the pointer, and the diaphragm leaves are opened up to maximum aperture, with the depth of field indicator pointers 70, 72 positioned relatively close to each other to indicate minimum depth of field corresponding to maximum diaphragm aperture.

If it is desired to select the diaphragm aperture manually rather than have it set automatically by the exposure meter (as might be the case, for example, when taking flash light photographs or under other special circumstances) the switching ring 60 is turned to bring the desired graduation of the aperture scale 66 opposite the index point 49. This causes the cam 90 on the ring 60 to thrust the rod 92 rearwardly so that the rear end 92' thereof engages the lower part of the clamping frame 16 (below the pivots 14) and prevents the upper part of the clamping frame from moving rearwardly into engagement with the pointer 8, even when rearward pressure is applied by the clamping lever 18. Also, the radial lug 61 on the switching ring 60 moves to a position corresponding to the diaphragm aperture which has been set on the scale 66, and thereby will serve as a stop to limit the motion of the lug 130 on the ring 132 and thereby determine the position to which the ring 132 can move in a clockwise direction when the lever 142 is moved to permit the feeler 140 to turn in a clockwise direction. The switching ring 60 is, of course, retained frictionally in the position in which it has been set, by any suitable known form of frictional detent, with sufficient firmness to enable the lug 61 to act as a stop for the lug 93.

If the release button 22 is now partially depressed, just as in the previous case of automatic control of the diaphragm aperture, this will move the lever 142 so that the spring 133 and 99 can move the feeler 140 and the rings 132 and 91, to a position controlled by the abutment lug 61 on the switching ring 60. The depth of field pointers 70 and 72 will thus be set to indicate a depth of field corresponding to the diaphragm aperture which has been set on the switching ring 60. During the swinging movement of the feeler 140, it may happen that the feeler will make contact with the exposure meter pointer 8 before the lug 130 makes contact with and is stopped by the lug 61. But if this occurs, the feeler 140 will simply carry the pointer 8 along with it, since the spring 133 will easily overcome the slight power of the exposure meter when the pointer 8 is not clamped. The rearward position of the thrust rod 92 has prevented the operation of the clamping frame 16 to clamp the pointer 8, as above mentioned.

The user can thus inspect the depth of field indication while he maintains the release plunger 22 in a partially depressed condition, just as in the case of automatic operation, and he can continue the downward movement of the plunger to trip the shutter and make the exposure if he finds the depth of field is satisfactory, or can relieve the downward pressure on the plunger and allow it to rise again if he finds that the depth of field is unsatisfactory and that he wants to make a change either in the shutter speed or in the diaphragm aperture setting or both. During manual diaphragm operation, just as in the case of automatic diaphragm operation, the diaphragm leaves are held in fully open position by the action of the lug 88, until the shutter is actually tripped to initiate the exposure.

The present construction has the considerable advantage that the user can bring the depth of field indicator into operation before each photograph, whether with automatic diaphragm control or with manual diaphragm control, and can check the satisfactoriness of the indicated depth of field before proceeding with the actual exposure. This reduces to a minimum the possibility of error or faulty pictures on account of an unsatisfactory depth of field. The present construction also has the further advantage that it can be produced with few if any additional parts in comparison to previous constructions which do not have the ability to observe the depth of field pointers prior to making the exposure, because it is only necessary, for purposes of the present invention, to provide a few additional simple driving lugs, pins, and the like, without any substantial increase in the number of parts or in the space requirements.

The construction is particularly suitable for use in a single lens reflex camera, because the diaphragm leaves remain at full or maximum aperture, for viewing purposes, even when the release plunger is partially depressed in order to observe the depth of field indication, and are not stopped down to the required aperture until the shutter is finally tripped to start its operating cycle. When the construction is to be used with some other type of camera (other than a single lens reflex camera) so that it is not necessary to keep the diaphragm leaves wide open for viewing purposes until the time of exposure, then the gear train 106, 108, 82, 82a, and the ring 84 and lug 88 can be entirely omitted since the function of these parts is to keep the diaphragm leaves at maximum aperture whenever the camera shutter is in tensioned or cocked position. With the omission of these parts, the diaphragm leaves will close down to the appropriate aperture either under control of the clamped pointer 8 or under control of the manually set lug 61, whenever the release plunger 22 is partially depressed in order to test or observe the depth of field which is available.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising an adjustable diaphragm including a movable aperture control member, a depth of field indicator including a movable setting member, exposure meter means, a feeler device including a movable abutment adapted to be set in a position corresponding to an indication of said exposure meter means, characterized by the fact that said movable abutment serves as a stop to limit movement of said setting member of said depth of field indicator, and said movable setting member serves as a stop to limit movement of said aperture control member.

2. A construction as defined in claim 1, including means for retaining said aperture control member in one limit position at certain times, and spring means tending to move said aperture control member to an opposite limit position, so that when said retaining means releases said aperture control member, said spring means will move said aperture control member to a position dependent upon the then position of said movable setting member of said depth of field indicator.

3. A construction as defined in claim 2, further including a manually operable switching member effective, upon movement to a predetermined position, to position said abutment manually and independently of said exposure meter means.

4. A construction as defined in claim 3, wherein said diaphragm aperture control member, said depth of field movable setting member, and said manually operable switching member are all in the form of rotatable rings rotatable about a common axis, the respective rings having respective lugs which cooperate with each other.

5. A construction as defined in claim 1, wherein said camera includes a focus distance scale and said depth of field indicator includes two movable pointers movable toward and away from each other over said focus distance scale.

6. A photographic camera comprising a lens and diaphragm unit having a lens focusing ring and a diaphragm aperture adjusting ring rotatable about a common axis, a focus distance scale marked circumferentially on said lens focusing ring, and a depth of field indicator including two pointers movable toward and away from each other in cooperative relation to said scale and a pointer operating ring rotatable about said common axis, characterized by an arm on said pointer operating ring, a spring tending to turn said aperture adjusting ring in one direction, and an arm on said aperture adjusting ring in position to engage said arm on said pointer operating ring to limit the extent of rotation of said aperture adjusting ring under the influence of said spring.

7. A photographic camera comprising a camera body unit and an interchangeable lens and diaphragm unit detachably mounted on said body unit, said lens and diaphragm unit having a lens focusing ring and a diaphragm aperture adjusting ring rotatable about a common axis, a focus distance scale marked circumferentially on said lens focusing ring, and a depth of field indicator including two pointers movable toward and away from each other in cooperative relation to said scale and a pointer operating ring rotatable about said common axis, characterized by an arm on said pointer operating ring, a spring tending to turn said aperture adjusting ring in one direction, a second spring tending to turn said pointer operating ring in the same direction, an arm on said aperture adjusting ring in position to engage said arm on said pointer operating ring to limit the extent of rotation of said aperture adjusting ring under the influence of its spring, and a control arm movably mounted on said camera body unit for engaging said arm on said pointer operating ring to limit the extent to which said pointer operating ring may turn under the influence of its spring, thereby also to limit the extent to which said aperture adjusting ring may turn under the influence of its spring.

8. A photographic camera comprising a camera body unit including exposure meter means, a control ring having a control arm thereon, and control ring operating means including a manually shiftable switch ring movable to one position wherein said control ring and control arm may be positioned in accordance with indications of said exposure meter means and movable to a plurality of other positions wherein said control ring and control arm may be positioned in accordance with the position to which said switch ring is moved, independently of the indications of said exposure meter means; and a lens and diaphragm unit having a lens focusing ring and a diaphragm aperture adjusting ring rotatable about a common axis, a focus distance scale marked circumferentially on said lens focusing ring, and a depth of field indicator including two pointers movable toward and away from each other in cooperative relation to said scale and a pointer operating ring rotatable about said common axis, characterized by an arm on said pointer operating ring, a spring tending to turn said aperture adjusting ring in one direction, a second spring tending to turn said pointer operating ring in the same direction, and an arm on said aperture adjusting ring in position to engage said arm on said pointer operating ring to limit the extent of rotation of said aperture adjusting ring under the influence of its spring, said control arm on said body unit lying in the path of travel of said arm on said pointer operating ring in position to limit the extent to which said pointer operating ring may turn under the influence of its spring, thereby also to limit the extent to which said aperture adjusting ring may turn under the influence of its spring.

9. A photographic camera comprising a camera body unit including exposure meter means, a control ring having a control arm thereon, control ring operating means including a manually shiftable switch ring movable to one position wherein said control ring and control arm may be positioned in accordance with indications of said exposure meter means and movable to a plurality of other positions wherein said control ring and control arm may be positioned in accordance with the position to which said switch ring is moved, independently of the indications of said exposure meter means, shutter mechanism including a tensioning ring rotatable from a run-down position to a tensioned position, and a diaphragm-restraining arm operatively connected to said tensioning ring and movable therewith to one position when said tensioning ring is in run-down position and to a second position when said tensioning ring is in tensioned position; and a lens and diaphragm unit having a lens focusing ring and a diaphragm aperture adjusting ring rotatable about a common axis, a focus distance scale marked on said lens focusing ring, and a depth of field indicator including two pointers movable toward and away from each other in cooperative relation to said scale and a pointer operating ring rotatable about said common axis, characterized by an arm on said pointer operating ring, a spring tending to turn said aperture adjusting ring in one direction, a second spring tending to turn said pointer operating ring in the same direction, an arm on said aperture adjusting ring in position to engage said arm on said pointer operating ring to limit the extent of rotation of said aperture adjusting ring under the influence of its spring, said control arm on said body unit lying in the path of travel of said arm on said pointer operating ring in position to limit the extent to which said pointer operating ring may turn under the influence of its spring, thereby also to limit the extent to which said aperture adjusting ring may turn under the influence of its spring, said diaphragm-restraining arm, when in its second position, engaging said aperture adjusting ring to hold it in a predetermined position against the force of its spring notwithstanding movement of said pointer operating ring which would otherwise permit movement of said aperture adjusting ring away from said predetermined position.

10. A photographic camera comprising shutter mechanism including a part movable from a tensioned position to a run-down position to cause an exposure, a latch for holding said part in tensioned position, diaphragm mechanism including a member movable to vary the size of a diaphragm aperture, depth of field indicating mechanism including a pointer movable to indicate a depth of field corresponding to a given size of diaphragm aperture, control mechanism including an element movable from a rest position in which it is effective to hold said member and said pointer each at one end of its respective range of travel, to a variable second position in which said element controls the distance through which said member and pointer may move away from said respective ends of their respective ranges of travel, springs tending to move said member and said pointer respectively away from said respective ends of said respective ranges of travel and to move said element away from its rest position toward its second position, blocking mechanism for holding said element in its rest position against the force of said springs, and a release member for operating both said latch and said blocking mechanism and having a two-part range of movement, in the first part of which said release member renders said blocking mechanism ineffective to hold said element but does not release said latch, so that said element may move from its rest position and said pointer may move to a position indicating a depth of field corresponding to a diaphragm aperture determined by said element, movement of said release member through the second part of its range being effective to release said latch to cause an exposure.

References Cited

UNITED STATES PATENTS 2,978,970   4/1961   Fahlenberg _____ 95—10 X

OTHER REFERENCES

German printed application, 1,138,625, October 1962.

NORTON ANSHER, *Primary Examiner.*

J. F. PETERS, *Assistant Examiner.*